United States Patent [19]

Seelenbinder et al.

[11] Patent Number: 5,075,723
[45] Date of Patent: Dec. 24, 1991

[54] DIAZO PHOTOCOPY MACHINE WITH AUTOMATIC SHEET SEPARATOR

[75] Inventors: Terry G. Seelenbinder, Elk Grove Village; Kerry L. Doll, Carol Stream, both of Ill.

[73] Assignee: AM International, Inc., Chicago, Ill.

[21] Appl. No.: 496,552

[22] Filed: Mar. 20, 1990

[51] Int. Cl.⁵ .............................................. G03B 27/30
[52] U.S. Cl. .................................... 355/106; 355/110; 355/111; 355/27
[58] Field of Search ................. 355/100, 106, 27, 110, 355/111, 43, 316, 24, 26

[56] References Cited

U.S. PATENT DOCUMENTS

| | | | |
|---|---|---|---|
| 3,343,834 | 9/1967 | Mazzio | 355/106 |
| 3,416,863 | 12/1968 | Ralston | 355/106 |
| 3,419,328 | 12/1968 | Klosky et al. | 355/106 |
| 3,591,286 | 7/1971 | Yanagawa | 355/106 |
| 3,655,184 | 4/1972 | Seelenbinder | 271/64 |
| 4,561,767 | 12/1985 | Aoki et al. | 355/26 |
| 4,937,622 | 6/1990 | Makiura | 355/316 |

Primary Examiner—Monroe H. Hayes
Attorney, Agent, or Firm—Nicholas A. Camasto

[57] ABSTRACT

A diazo copy machine comprises a roll of diazo sensitized copy paper cradled between a pair of drive rollers above an exposure apparatus. The copy machine is activated by insertion of an original tracing sheet whereupon the copy paper and original are automatically fed in superimposed relation into the entrance of the exposure apparatus, with the leading edge of the copy paper being advanced by a programmable amount relative to the leading edge of the original. Upon exiting the exposure apparatus the superimposed sheets are directed to an automatic sheet separating apparatus which deflects and feeds the copy paper along a downward path to a developer and carries the original along an exit path out of the front of the copy machine. In the event that the two superimposed sheets both inadvertently enter the downward path, a fail-safe mode of operation is initiated for redirecting both sheets along the exit path.

22 Claims, 7 Drawing Sheets

DIAZO PHOTOCOPY MACHINE WITH AUTOMATIC SHEET SEPARATOR

BACKGROUND OF THE INVENTION

The present invention relates generally to contact printing photocopy machines and particularly concerns apparatus for feeding and separating the original and copy sheets in a diazo photocopy machine.

Diazo photocopy machines are well known in the art, U.S. Pat. No. 3,655,184 providing an exemplary disclosure of one such machine. Copying is effected in such machines through a process by which a diazo sensitized copy sheet and an original tracing are arranged in superimposed relation and then fed into the exposure apparatus of the machine. Typical exposure units include a tubular lamp arrangement about which the superimposed sheets are passed to image the light sensitive copy sheet. After exposure, the sheets are separated, with the original sheet exiting the machine and the copy being fed to a developing unit for further processing.

In early diazo photocopy machines the two superimposed sheets exiting from the exposure apparatus were typically manually separated. Automatic sheet separation apparatus were subsequently developed and significantly improved the efficiency with which the machines were operated. For example, the previously mentioned patent discloses an automatic sheet separating apparatus including a pair of feed rollers mounted adjacent the exit area of the exposure apparatus for receiving the exiting superimposed sheets. The rollers are operated at a differential rotational speed for advancing the leading edge of the copy sheet relative to the leading edge of the original. A further roller having a roughened outer surface is provided for deflecting the advanced copy sheet upwardly while the original sheet is guided out of the front of the machine. The upwardly deflected copy sheet is subsequently directed to a developing unit for further processing.

While diazo photocopy machines of the type described above have provided exceptional service through the years, certain aspects of their design and operation have been less than optimal. Initially, the prior art machines are characterized by a relatively large footprint due to the arrangement of the various paper paths through the machine and, particularly due to the upward deflection of the copy sheet by the automatic sheet separator apparatus. Furthermore, failure of proper sheet separation was generally not accounted for and could lead to serious malfunctions in the copy machine.

OBJECTS OF THE INVENTION

It is therefore a basic object of the present invention to provide an improved diazo photocopy machine.

It is a further object of the invention to provide a diazo photocopy machine characterized by a relatively small footprint.

It is yet another object of the invention to provide a diazo photocopy machine having a novel automatic sheet separating apparatus wherein the exposed copy sheet is guided in a downwardly direction upon being separated from the original tracing sheet.

It is still another object of the invention to provide an electronic interface for conveniently and efficiently controlling the operation of the automatic sheet separation apparatus.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
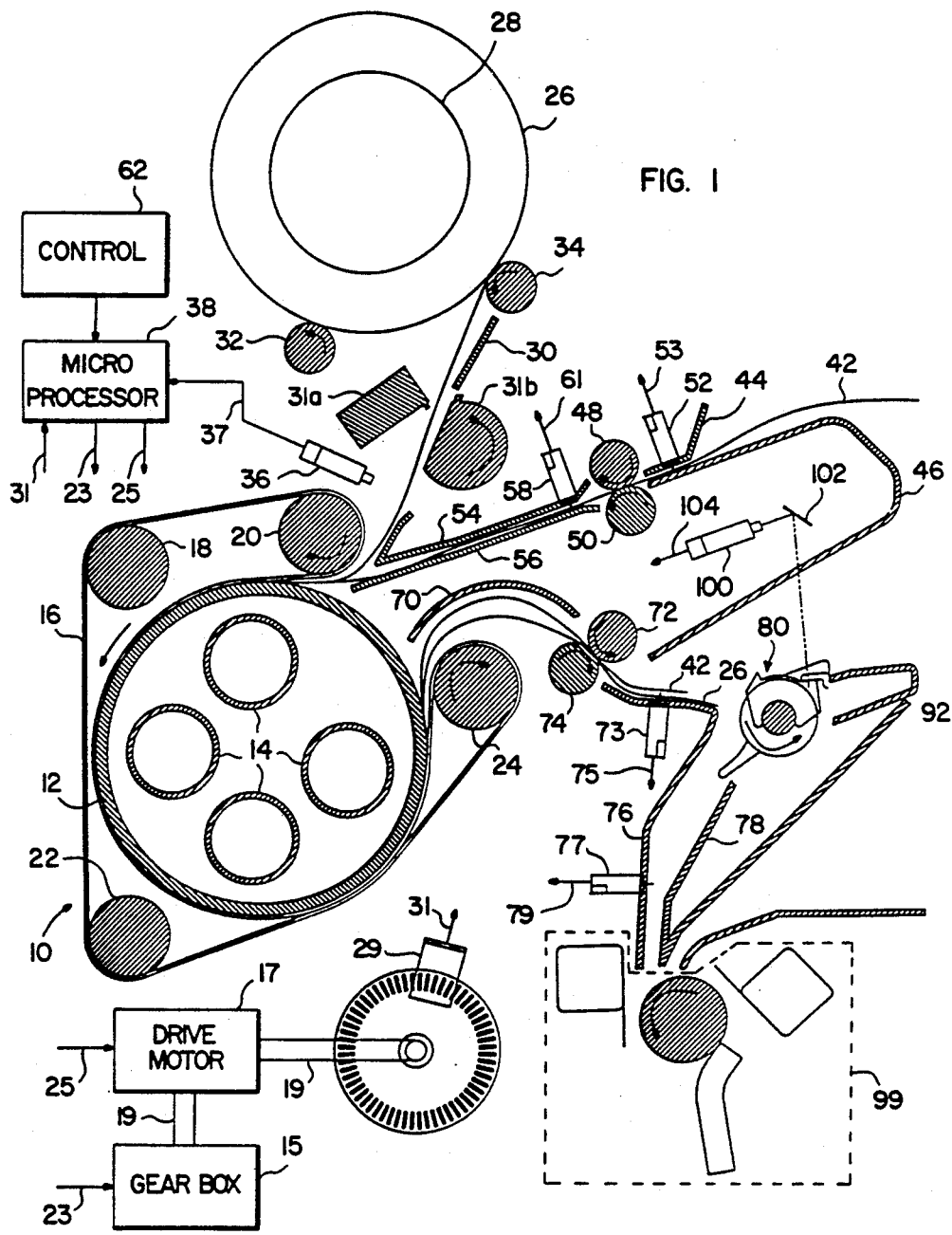
FIGS. 1-3 are side sectional views of the diazo photocopy machine of the invention illustrating the progression of the superimposed original and copy sheets through the machine and their proper separation upon exiting the exposure apparatus.

Referring now to the drawings in greater detail, wherein like reference numerals have been used to designate similar parts throughout the various views, there is illustrated in FIGS. 1-6 a diazo photocopy machine including an exposure apparatus 10. The exposure apparatus comprises a tubular elongated glass cylinder 12 having a plurality of tubular elongated lamps 14 mounted therein. An endless belt 16 is mounted for movement on a plurality of rollers 18, 20, 22 and 24 and encircles glass cylinder 12 for providing rotational movement thereto in the direction of the arrow as the belt is moved in contact therewith. Rotational movement is imparted to rollers 20 and 24 through a gear box 15 which is coupled to a drive motor 17 by a drive shaft 19. Gear box 15 and drive motor 17 are controlled in response to respective inputs 23 and 25 supplied by a suitably programmed microprocessor 38. Drive shaft 19 is also connected for operating an encoder wheel 27 which includes a plurality of slots disposed about the circumference thereof. A "break-the-beam" sensor 29 is disposed on encoder wheel 27 for providing a stream of timing pulses over an output 31 to microprocessor 38 as the slots in the wheel rotate past the beam generated by sensor 29. It will be appreciated that the stream of timing pulses supplied to microprocessor 38 by sensor 29 represents the rotational speed of drive motor 17 and thereby the amount of paper travel throughout the photocopy machine.

A supply of diazo sensitized copy paper 26 is provided on a cylindrical cardboard core 28 and cradled between a pair of rollers 32 and 34 which are driven through gear box 15. Rollers 32 and 34 contact copy paper supply 26 providing rotational movement thereto for feeding the copy paper past a guide plate 30 and into the entrance of an automatic knife comprising knife parts 31a and 31b. As will be explained in further detail hereinafter, the knife is operated in response to an output of microprocessor 38 for automatically cutting the copy paper to a size matching the original tracing.

An original tracing sheet 42 is inserted into the photocopy machine between a pair of guide plates 44 and 46 and is directed therefrom toward the nip of a pair of drive rollers 48 and 50. An optical sensor 52, having an output 53 connected to microprocessor 38 is disposed above guide plate 44 and positioned for detecting the insertion of original tracing sheet 42 into the photocopy machine. Sensor 52 couples a signal to microprocessor 38 over output 53 in response to the detection of original sheet 42 for activating the photocopy machine. Microprocessor 38 is responsive to the activation signal from sensor 52 for causing rollers 48 and 50 to advance original sheet 42 to a position at the entrance of a narrow channel formed by a pair of guide plates 54 and 56. In response to the depression of a print switch on a control panel 62 interfacing with microprocessor 38, the microprocessor next causes rollers 32 and 34 to advance the copy paper 26 to a position slightly beyond an optical sensor 36 disposed adjacent the entrance of exposure apparatus 10 at the nip between glass cylinder 12 and roller 20. Sensor 36 provides a signal to microprocessor 38 over an output 37 upon detection of the copy paper to stop its advance at this position. At this point, rollers 48 and 50 are again operated in response to an output from microprocessor 38 for advancing original tracing sheet 42 towards the entrance of exposure apparatus 10 through the narrow channel formed between guide plates 54 and 56. Another optical sensor 58 is provided adjacent the opposite side of drive rollers 48 and 50 for detecting the presence of original tracing sheet 42 at the entrance of the channel formed by guide plates 54 and 56. Rollers 32 and 34 are now again operated for advancing the copy paper such that it and original tracing sheet 42 are thereby provided in superimposed relation at the entrance of exposure station 10, with the original document being maintained closest to the outer surface of cylinder 12. The superimposed sheets are sandwiched between belt 16 and the outer surface of cylinder 12, and carried in the direction of the arrow about the cylinder during which time the diazo sensitized copy sheet is imaged. The superimposed sheets 26 and 42 leave the exposure apparatus at an exit area near the nip of roller 24 and cylinder 12.

To facilitate the subsequent automatic separation of the copy and original sheets 26 and 42, the leading edge of copy sheet 26 preferably exits exposure apparatus 10 in advance of the leading edge of the original tracing sheet. The provision of a predetermined spacing between the leading edges of the copy and original sheets 26 and 42 at the exit of exposure apparatus 10 is established according to the present invention by controlling the relative positions of the leading edges of the two superimposed sheets as they approach the entrance of exposure apparatus 10. More particularly, sensor 58 provides a signal on output 61 to microprocessor 38 reflecting the advance of the leading edge of original sheet 42 towards the entrance of the exposure apparatus in response to the drive imparted thereto by rollers 48 and 50. Thereafter, microprocessor 38 causes rollers 32 and 34 to initiate the advance of copy paper 26 from its stopped position just past sensor 36 at a time selected for presenting the leading edge of the copy paper at the entrance of exposure apparatus 10 in advance of the leading edge of the original sheet. Thus, by operating roller pairs 32,34 and 48,50 under the control of microprocessor 38 a predetermined spacing is established in the positions of the leading edges of the copy and original sheets, with the former being advanced relative to the latter, as they approach the entrance of exposure station 10. This spacing will of course be maintained at the exit of the exposure station as desired.

According to another aspect of the invention, the amount of spacing between the leading edges of the copy and original sheets as they approach the entrance of exposure apparatus 10 (and as they exit the exposure apparatus) is programmable by a suitable manually operable switch on control panel 62. It may be desirable to increase or decrease this differential as the result of a number of different factors including the amount of wear on machine components and the characteristics of the original tracing sheet.

According to yet another aspect of the invention, sensor 58 also provides an output to microprocessor 38 in response to detection of the trailing edge of the original sheet. The microprocessor, calculates the length of the original sheet based on this output and the previous output from sensor 58 reflecting the leading edge of the original sheet. The calculated length of the original sheet is then used by the microprocessor to operate knife 31a and 31b to cut the copy paper 26 to a matching length. This is possible because the length of the copy paper between the knife and its stopped position adjacent the entrance of exposure apparatus 10 is precisely controlled by the microprocessor in response to the copy paper detection signal developed on output 37 of sensor 36.

Figure 3:
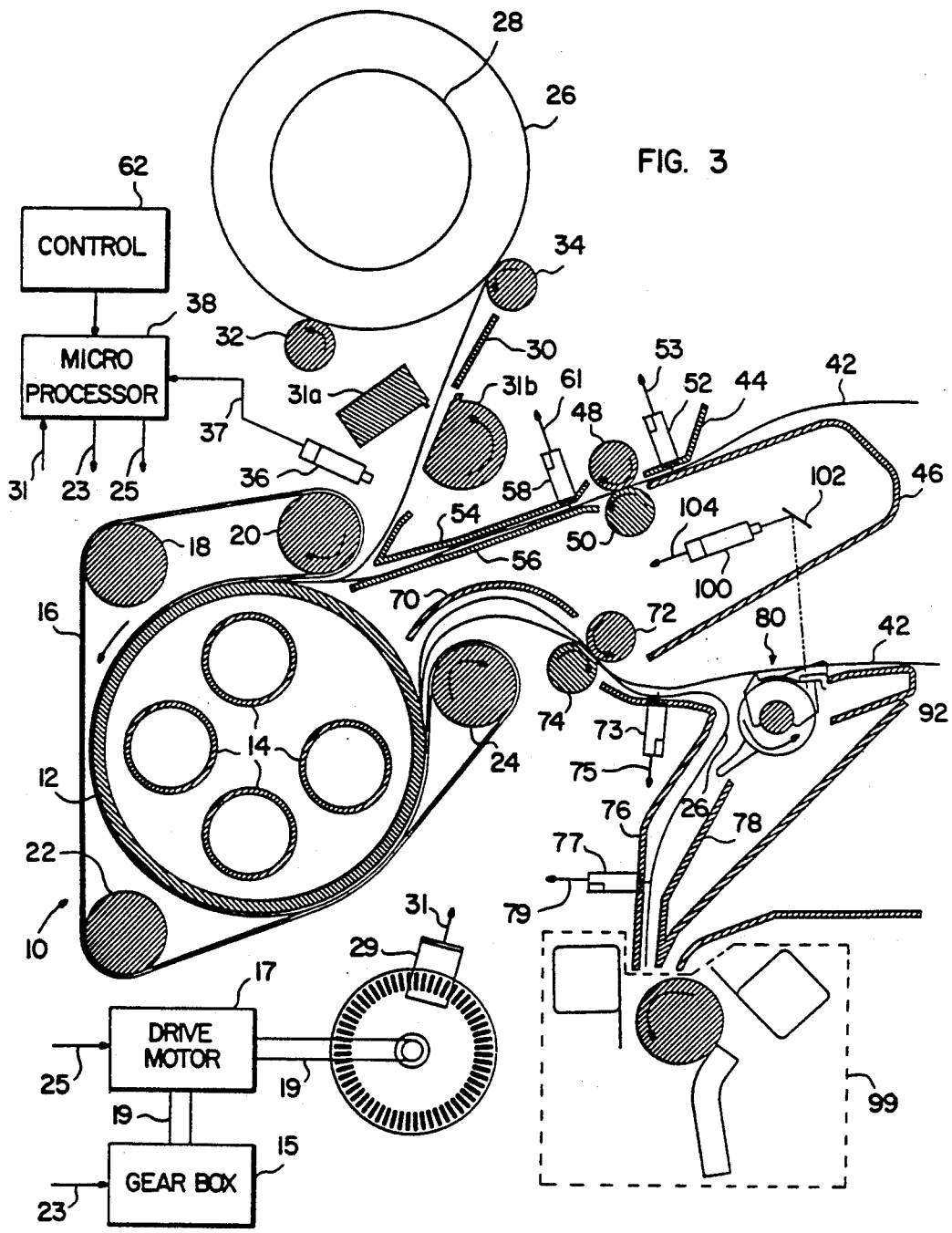
Figure 4:
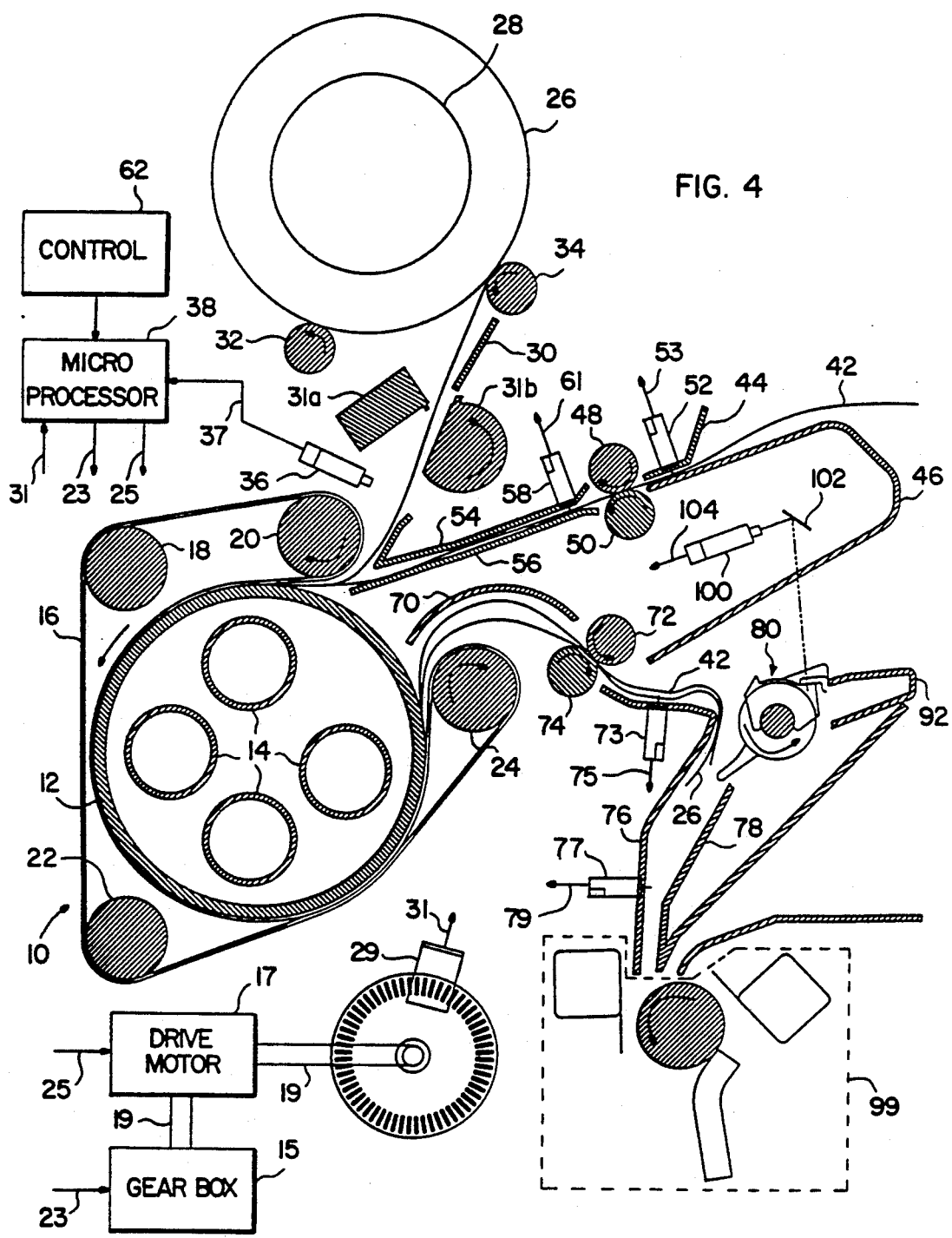
FIGS. 4-6 are side sectional views similar to FIGS. 1-3 but illustrating the fail-safe operation of the diazo machine upon improper separation of the original and copy sheets upon exiting the exposure apparatus.

As they exit exposure apparatus 10 superimposed copy and original sheets 26 and 42 are deflected by an annular guide plate 70 towards the nip of a further pair of rollers 72 and 74, roller 74 preferably being operated at a slightly faster rotational speed than roller 72. Rollers 72 and 74 feed the superimposed sheets along a path defined by one leg of a V-shaped guide plate 76, with the leading edge of the copy sheet somewhat advanced relative to the leading edge of the original (see FIG. 1). An optical sensor 73 having an output 75 connected to microprocessor 38 is provided along this path for sensing the paper exiting from exposure apparatus 10. An automatic sheet separating apparatus 80 is disposed downstream of sensor 73 adjacent the apex of guide plate 76 for separating the copy and original sheets. As will be explained in more detail hereinafter, in normal operation the copy sheet 26 is carried downwards along a converging path defined by the second leg of guide plate 76 and a further guide plate 78. This latter path, along which is disposed another optical sensor 77 having an output 79 connected to microprocessor 38, leads the copy sheet to the developing portion 99 of the photocopy machine. The original sheet 42, on the other hand, is carried out of the front of the photocopy machine over the separation apparatus 80 as best shown in FIG. 3.

Figure 7:
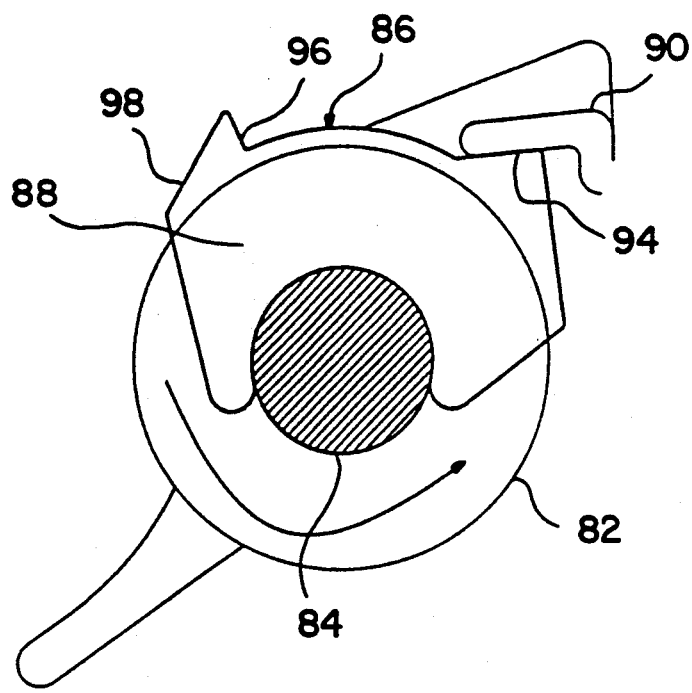
FIGS. 7 and 8 are side elevation views of the automatic sheet separation apparatus of the invention in its normal and fail-safe modes of operation respectively.
Figure 8:
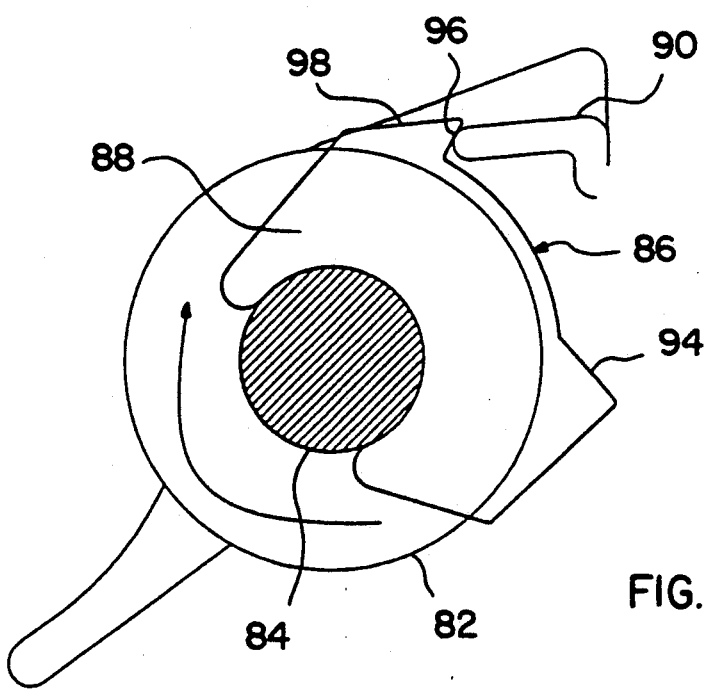

Referring to FIG. 7, automatic sheet separation apparatus 80 includes a roller 82, preferably comprising a roughened outer surface such as a knobby gum rubber material, mounted about a central shaft 84 for rotation in the direction indicated by the arrow. A clip 86, preferably formed of plastic or any other suitable material, includes an annular body portion 88 loosely mounted on central shaft 84 and rotatable therewith between a first normal operating position (see FIGS. 1-3 and 7) and a second retracted position (see FIGS. 5-6 and 8). In the normal operating position a fixed stop member 90, secured to a bracket 92, engages a first shoulder 94 of clip 86 and, in the retracted position, engages a second shoulder 96 of clip 86.

Figure 2:
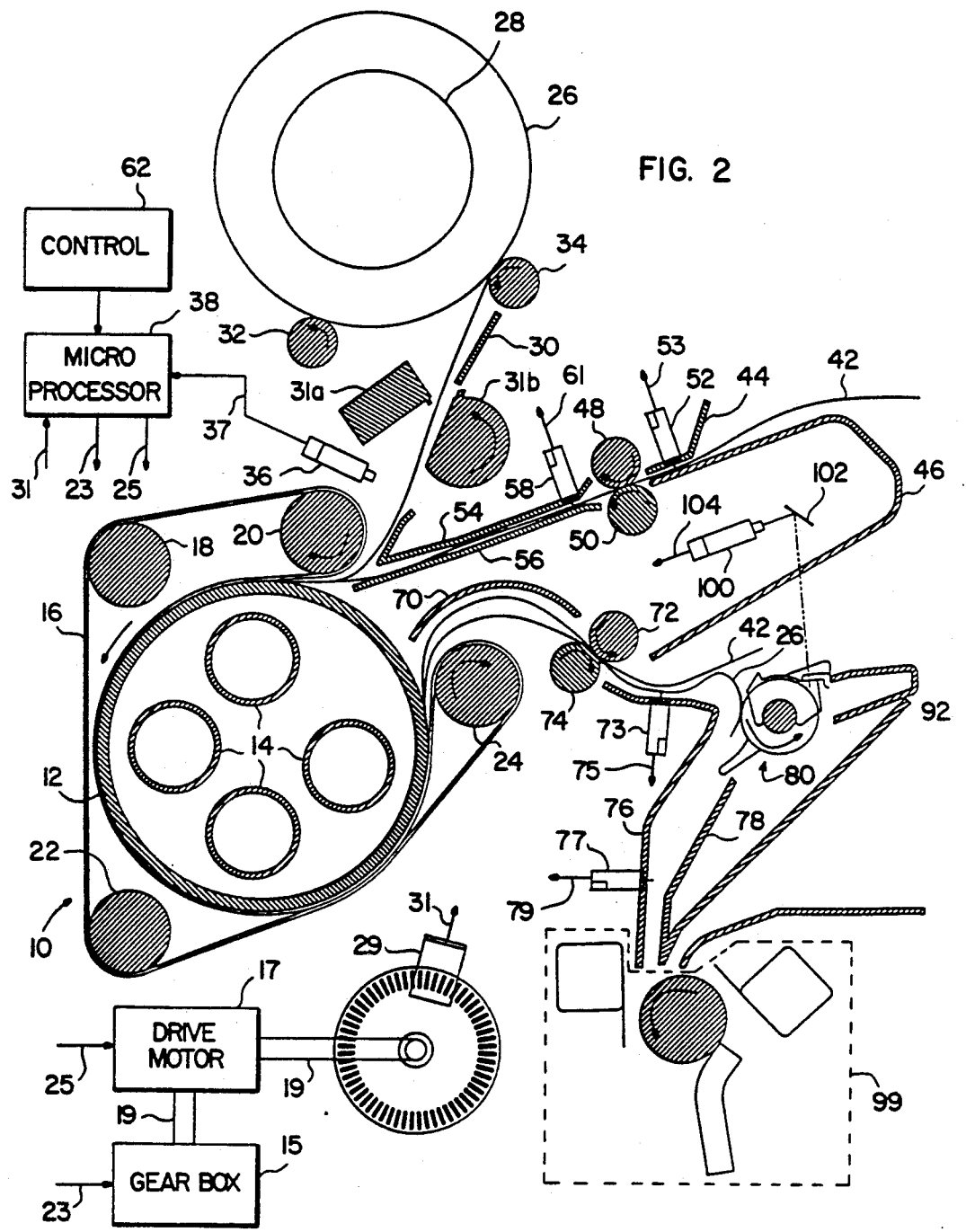

In operation, roller 82 and central shaft 84 are normally caused to rotate in a counter clockwise direction as indicated by the arrow in FIGS. 1-4 and 7. This rotation urges clip 86 in a counter clockwise direction to a first limit when shoulder 94 is engaged by stop member 90 as shown in FIGS. 1-4 and 7. In FIG. 1, the superimposed copy and original sheets are shown being advanced towards the separator apparatus (with the leading edge of the copy sheet advanced relative to that of the original) with clip 86 positioned at its first limit. Rotation of roller 82 is stopped in response to the detection of the leading edge of copy sheet 26 by sensor 73. The leading edge of copy sheet 26 contacts roller 82 buckling the copy paper and deflecting it downwardly into the converging path defined by guide plates 76 and 78 leading to the developing portion of the photocopy machine as shown in FIG. 2. The later arriving original sheet is deflected over roller 82 by an inclined surface 98 of clip 86 opposite shoulder 96. After a predetermined amount of paper has passed sensor 73 counter clockwise rotation of roller 82 is resumed at a relatively fast rotational speed to reduce the buckle in the copy paper and for driving it through the path between guide plates 76 and 78 towards the developer (see FIG. 3). At the same time, the original sheet is carried past separating apparatus 80 and exits at the front of the photocopy machine.

An optical sensor 100, in association with a mirror 102, is provided for sensing the presence of the exiting original sheet 42 as it passes by sheet separating apparatus 80. A suitable control signal reflecting this condition is coupled by sensor 100 to microprocessor 38 over a conductor 104. As a result of this control signal, the microprocessor maintains the drive of roller 82 and central shaft 84 in the counter clockwise rotational direction shown in FIGS. 1-3 and 7. This is the normal operating condition of sheet separating apparatus 80 which provides for the downward deflection of copy sheet 26 to the developing apparatus and for the exiting of original sheet 42 from the front of the photocopy machine.

Figure 5:
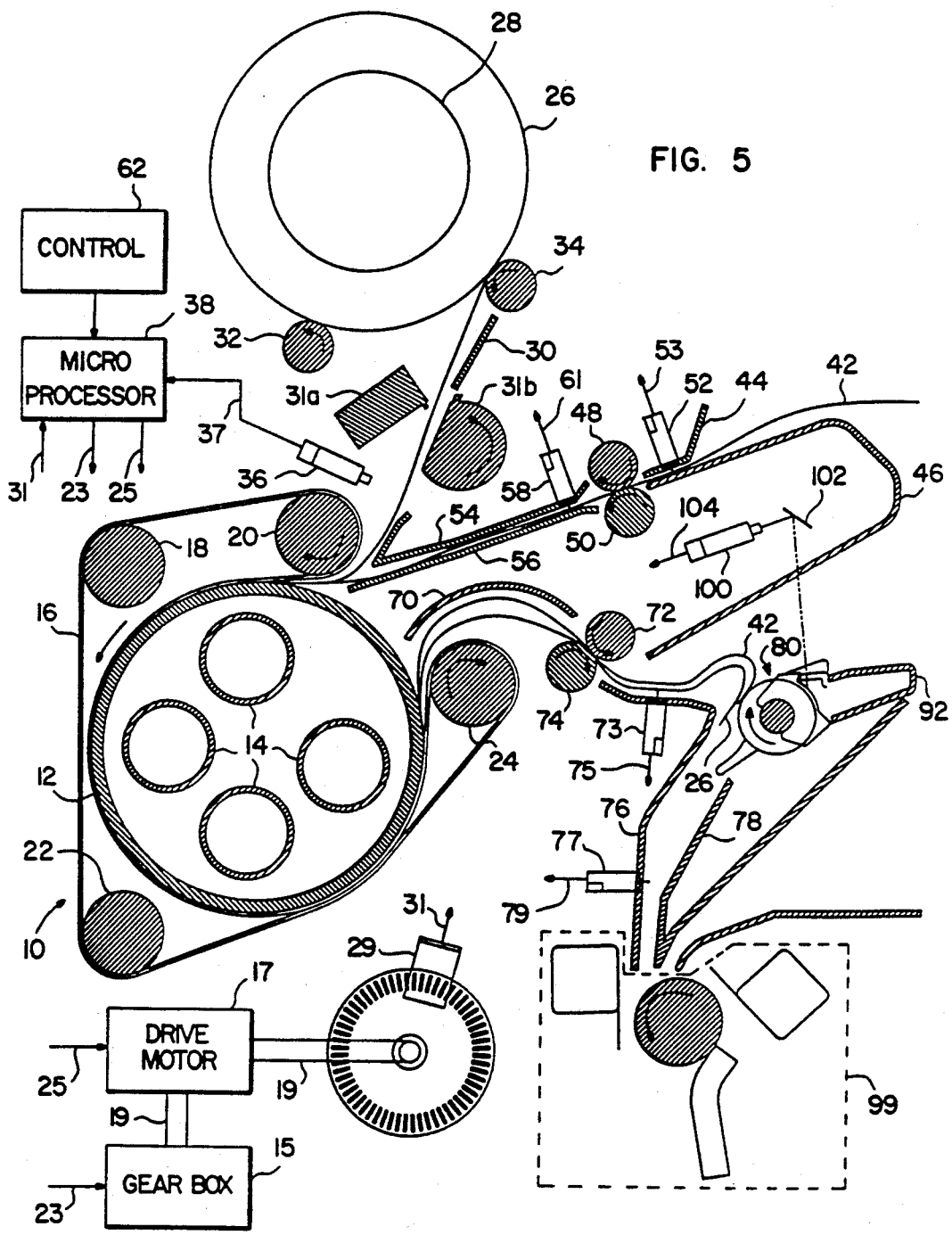
Figure 6:
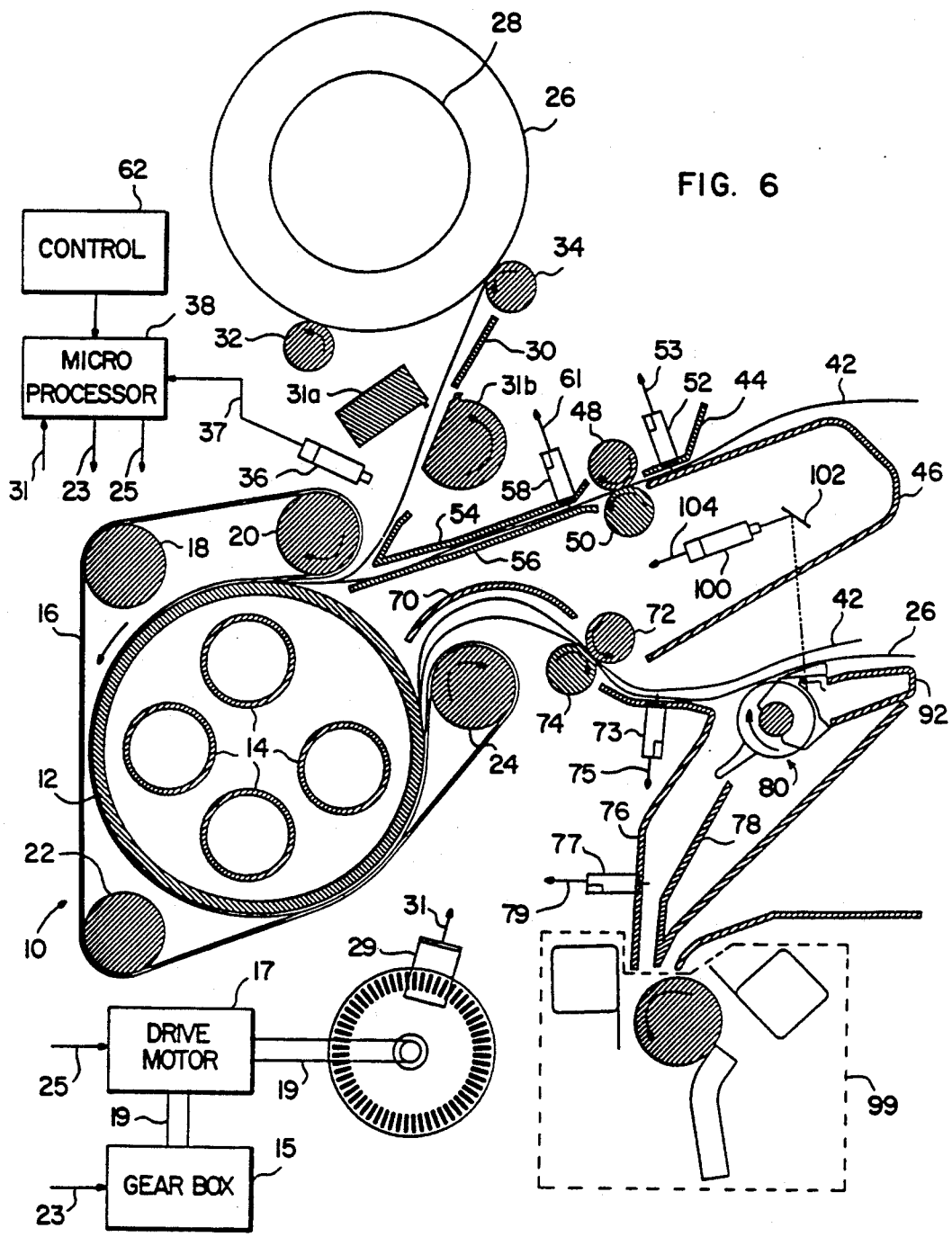

A fail-safe mode of operation is also provided in the event that microprocessor 38 does not receive a signal from sensor 100 within a given time interval after the original sheet was inserted in the photocopy machine. The failure to receive such a signal from sensor 100 is indicative of the condition illustrated in FIG. 4, wherein both the copy and original sheets have erroneously entered the downward path between guide plates 76 and 78 and are being directed toward the developing apparatus. It will be appreciated that this condition can lead to a malfunction of the photocopy machine and must therefore be accounted for in some manner. Thus, in accordance with the present invention, microprocessor 38 is responsive to the failure of sensor 100 to provide the exiting paper detection signal within the given time interval for reversing the rotational direction of roller 82 and central shaft 84 as shown in FIG. 5. This change in rotational direction of roller 82 and central shaft 84 serves to retract clip 86 by urging it in a clockwise direction to its second limit (see FIGS. 5-6 and 8) wherein stop member 90 engages shoulder 96. As a result, deflecting surface 98 of clip 86 is retracted to a substantially horizontal position exposing a greater portion of the outer surface of roller 82 to the superimposed sheets exiting the exposure apparatus.

As shown in FIG. 5, the superimposed sheets 26 and 42 now come into contact with the roughened outer surface of roller 82 and are forced thereby upwards out of the downward path defined by guide plates 76 and 78 which lead to the developer. This process is greatly facilitated by retracting clip 86 as illustrated thereby exposing more of the roughened outer surface of roller 82 for initially reversing the downward motion of the two sheets (see FIG. 5) and then directing the two sheets out of the front of the photocopy machine (see FIG. 6).

An additional fail-safe mode of operation is provided in the event that microprocessor 38 does not receive a signal from sensor 77 reflecting the absence of paper in the path between guide plates 76 and 78 following a predetermined time interval after reversal of roller 82. The failure to receive this signal indicates that the copy and original sheets have not been appropriately forced upwards out of the path leading to the developer. To prevent paper jams and other malfunctions, microprocessor 38 de-activates the photocopy machine in response to this condition. Finally, as long as sensor 77 continues to detect the presence of paper while no paper is detected by sensor 100, the microprocessor will inhibit reactivation of the photocopy machine until the paper jam is cleared.

What has thus been shown is an extremely efficient and highly automated diazo photocopy machine and an improved automatic sheet separator for use therewith. The photocopy machine occupies a very small footprint and includes a novel electronic interface providing a fail-safe mode of operation in the event of improper sheet separation. It is recognized that numerous changes and modifications in the described embodiment of the invention may be made without departure from its true spirit and scope. The invention is to be limited only as defined in the claims.

What is claimed is:

1. A copy machine for making a copy of an original tracing comprising:
   exposure means having a sheet receiving entrance and a sheet outputting exit;
   a source of light sensitized copy paper disposed above said exposure means;
   feed means responsive to the insertion of said original tracing for automatically directing said copy paper and said original tracing in superimposed relative into the sheet receiving entrance of said exposure means;
   sensing means for developing a control signal in response to the detection of said copy paper or original tracing at the exit of said exposure means; and
   separating means comprising roller means receiving the superimposed copy paper and original tracing from the exit of said exposure means, said roller means temporarily assuming a non-rotating mode in response to said control signal for directing the copy paper along a downward path to a developer and the original tracing along an exit path out of the front of said copy machine, said roller means thereafter initiating rotation in a first direction for feeding the copy paper and the original tracing along said downward and exit paths respectively.

2. A copy machine according to claim 1 including:
   motor means operable for driving said roller means;
   encoder means for generating an output signal representing the rotational speed of said motor means and thereby the amount of paper travel through said copy machine; and
   control means responsive to said output signal and to said control signal for controlling the operation of said motor means.

3. A copy machine according to claim 1 wherein said source of copy paper comprises a roll of diazo sensitized copy paper cradled between a pair of spaced drive rollers disposed substantially directly above said exposure means and operable for feeding said copy paper to the entrance of said exposure means.

4. A copy machine according to claim 1 including second sensing means for developing a second control signal in response to the absence of said original tracing along said exit path after exiting said exposure means, said roller means being responsive to said second control signal for reversing its direction of rotation for directing both said copy paper and said original tracing from said downward path to said exit path.

5. A copy machine according to claim 4 wherein said second sensor means comprises means for developing said second control signal in response to the expiration of a given time interval following the insertion of said original tracing in said feed means.

6. A copy machine according to claim 4 wherein said feed means comprises means for supplying said copy paper and said original tracing to said separating means with the leading edge of the copy paper advanced by a programmable amount relative to the leading edge of the original tracing.

7. A copy machine according to claim 6 including third sensor means for sensing and controlling the positions of the leading edges of the copy paper and the original tracing at the entrance of said exposure means and further including means responsive to said third sensor means for advancing the leading edge of said copy paper relative to the leading edge of said original tracing at the entrance of said exposure means by said programmable amount.

8. A copy machine according to claim 4 wherein said roller means comprises a cylindrical roller including a central shaft having a paper guide clip rotatably mounted thereon, said guide clip assuming a forward paper separating position in response to rotation of said roller in said first direction and assuming a retracted position exposing a greater portion of the outer surface of said roller to said copy paper and original tracing in response to rotation of said roller in said reverse direction.

9. A copy machine according to claim 8 wherein said separating means includes a stop member and wherein said guide clip includes a pair of spaced shoulders, said stop member engaging one of said shoulders for limiting the rotation of said guide clip to said forward position in response to rotation of said roller in said first direction and said stop member engaging the other shoulder for limiting the rotation of said clip to said retracted position in response to rotation of said roller in said reverse direction.

10. A copy machine according to claim 9 wherein said guide clip includes a surface disposed adjacent said first shoulder, said surface assuming a generally upright position to facilitate separation of said copy paper and said original tracing when said guide clip is in said forward position and assuming a generally horizontal position when said guide clip is in said retracted position.

11. A copy machine for making a copy of an original tracing comprising:
- a source of light sensitized copy paper;
- exposure means disposed substantially directly below said paper source and having a sheet receiving entrance and a sheet outputting exit, said exposure means being adapted for light imaging said copy paper in accordance with said original tracing;
- feed means responsive to the insertion of said original tracing automatically supplying the copy paper and the original tracing in superimposed relation to the sheet receiving entrance of said exposure means and with the leading edge of said copy paper advanced relative to the leading edge of the original tracing by a programmable amount, said superimposed sheets also being provided at the exit of said exposure means with the leading edge of the copy paper advanced relative to the leading edge of the original tracing;
- sensing means for developing a control signal in response to the detection of said copy paper or original tracing at the exit of said exposure means;
- separating means comprising roller means receiving said superimposed sheets from the exit of said exposure means, said roller means temporarily assuming a non-rotating mode in response to said control signal for directing the copy paper along a downward path to a developer and the original tracing along an exit path out of the front of said machine, said roller means thereafter initiating rotation in a first direction for feeding the copy paper and original tracing along said downward and exit paths respectively; and
- second sensing means for developing a second control signal in response to the absence of said original tracing along said exit path after exiting said exposure means, said roller means being responsive to said second control signal for reversing its direction of rotation for redirecting both said copy paper and said original tracking from said downward path to said exit path.

12. A copy machine according to claim 11 including:
- motor means operable for driving said roller means;
- encoder means for generating an output signal representing the rotational speed of said motor means and thereby the amount of paper travel through said copy machine; and
- control means responsive to said output signal, to said control signal and to said second control signal for controlling the operation of said motor means.

13. A copy machine according to claim 11 wherein said feed means comprises third sensor means for sensing and controlling the positions of the leading edges of the copy paper and the original tracing at the entrance of said exposure means and further including means responsive to said third sensor means for advancing the leading edge of said copy paper relative to the leading edge of said original tracing at the entrance of said exposure means by a programmable amount.

14. A copy machine according to claim 11 wherein said roller means comprises a cylindrical roller including a central shaft having a paper guide clip rotatably mounted thereon, said guide clip assuming a forward paper separating position in response to rotation of said roller in said first direction and assuming a retracted position exposing a greater portion of the outer surface of said roller to said copy paper and original tracing in response to rotation of said roller in said reverse direction.

15. A copy machine according to claim 14 wherein said separating means includes a stop member and wherein said guide clip includes a pair of spaced shoulders, said stop member engaging one of said shoulders for limiting the rotation of said guide clip to said forward position in response to rotation of said roller in said first direction and said stop member engaging the other shoulder for limiting the rotation of said clip to said retracted position in response to rotation of said roller in said reverse direction.

16. A copy machine according to claim 15 wherein said guide clip includes a surface disposed adjacent said first shoulder, said surface assuming a generally upright position to facilitate separation of said copy paper and said original tracing when said guide clip is in said forward position and assuming a generally horizontal position when said guide clip is in said retracted position.

17. A copy machine according to claim 11 wherein said source of copy paper comprises a roll of diazo sensitized copy paper cradled between a pair of spaced drive rollers operable for feeding said copy paper to the entrance of said exposure means.

18. In a copy machine of the type including means for providing at the exit of an exposure means a light imaged copy sheet in superimposed relation with an original tracing sheet with the leading edge of the copy sheet being advanced relative to the leading edge of the original sheet, an improved automatic sheet separating apparatus comprising roller means receiving said superimposed sheets, said roller means temporarily assuming a non-rotating mode for directing the copy sheet along a downward path toward a developer and the original sheet along an exit path out of the front of the copy machine, said roller means thereafter initiating rotation in a first direction for feeding the copy paper and original tracing along said downward and exit paths respectively.

19. A copy machine according to claim 18 including first sensing means for developing a first control signal in response to the absence of said original tracing sheet along said exit path, said roller means being responsive to said first control signal for reversing its direction of rotation for redirecting both said copy paper and said original tracing from said downward path to said exit path.

20. A copy machine according to claim 19 wherein said roller means comprises a cylindrical roller including a central shaft having a paper guide clip rotatably mounted thereon, said guide clip being urged to a forward paper separating position in response to rotation of said roller in said first direction and being urged to a retracted position exposing a greater portion of the outer surface of said roller to said copy sheet and original tracing sheet in response to rotation of said roller in said reverse direction.

21. A copy machine according to claim 20 wherein said guide clip includes a pair of spaced shoulders, said copy machine including a stop member fixedly secured thereto for engaging one of said shoulders for limiting the rotation of said guide clip to said forward position in response to rotation of said roller in said first direction and said stop member engaging the other shoulder for limiting the rotation of said clip to said retracted position in response to rotation of said roller in said reverse direction.

22. A copy machine according to claim 21 wherein said guide clip includes a surface disposed adjacent said first shoulder, said surface assuming a generally upright position to facilitate separation of said copy sheet and said original tracing sheet when said guide clip is in said forward position and assuming a generally horizontal position when said guide clip is in said retracted position.

* * * * *